United States Patent
Nagatsuka

[11] Patent Number: 6,038,100
[45] Date of Patent: *Mar. 14, 2000

[54] RECORDING AND/OR REPRODUCING APPARATUS WITH VARIABLY DAMPED CASSETTE LOADING MECHANISM

[75] Inventor: Osamu Nagatsuka, Kanagawa-ken, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/508,355

[22] Filed: Jul. 27, 1995

[30] Foreign Application Priority Data

Aug. 6, 1994 [JP] Japan ................................ 6-204617
Jun. 7, 1995 [JP] Japan ................................ 7-140456
Jun. 7, 1995 [JP] Japan ................................ 7-140457

[51] Int. Cl.$^7$ ........................................... G11B 15/675
[52] U.S. Cl. ................ 360/96.6; 242/338.4; 360/96.5
[58] Field of Search .................. 360/96.5, 96.6; 242/338.4

[56] References Cited

U.S. PATENT DOCUMENTS 4,159,495 6/1979 Tsutsumi .............................. 360/96.5
4,564,875 1/1986 Ihara ................................... 360/96.6
5,355,265 10/1994 Kim ..................................... 360/96.6
5,390,055 2/1995 Maehara et al. ..................... 360/96.6
5,481,419 1/1996 Fujishiro ............................. 360/96.5
5,825,583 10/1998 Kang et al. .......................... 360/96.6

FOREIGN PATENT DOCUMENTS

60-055543 3/1985 Japan .................................. 360/96.6
3-160656 7/1991 Japan .................................. 360/96.6

*Primary Examiner*—Craig A. Renner
*Attorney, Agent, or Firm*—Robin, Blecker & Daley

[57] ABSTRACT

A cassette loading device is provided with a chassis, a cassette holder for holding a cassette, a link mechanism, an urging member which urges the cassette holder to move from a first position to a second position, and a damper. The link mechanism is arranged to support the cassette holder in such a way as to move the cassette holder between the first position and the second position relative to the chassis. The link mechanism includes a lever. One end of the lever is rotatably carried by one of the chassis and the cassette holder while the other end of the lever is provided with a gear part and is slidably engaging the other of the chassis and the cassette holder. The gear part is composed of at least two gears having different pitch circles. The damper also has a gear part which is arranged to engage the gear part of the lever.

24 Claims, 12 Drawing Sheets

RECORDING AND/OR REPRODUCING APPARATUS WITH VARIABLY DAMPED CASSETTE LOADING MECHANISM

BACKGROUND OF THE INVENTION

1. Field of the Invention

This invention relates to a cassette loading device for moving up and down a cassette holder which accommodates a cassette and also to a recording and/or reproducing apparatus such as a VTR or the like which is equipped with the cassette loading device.

2. Description of the Related Art

Figure 1:
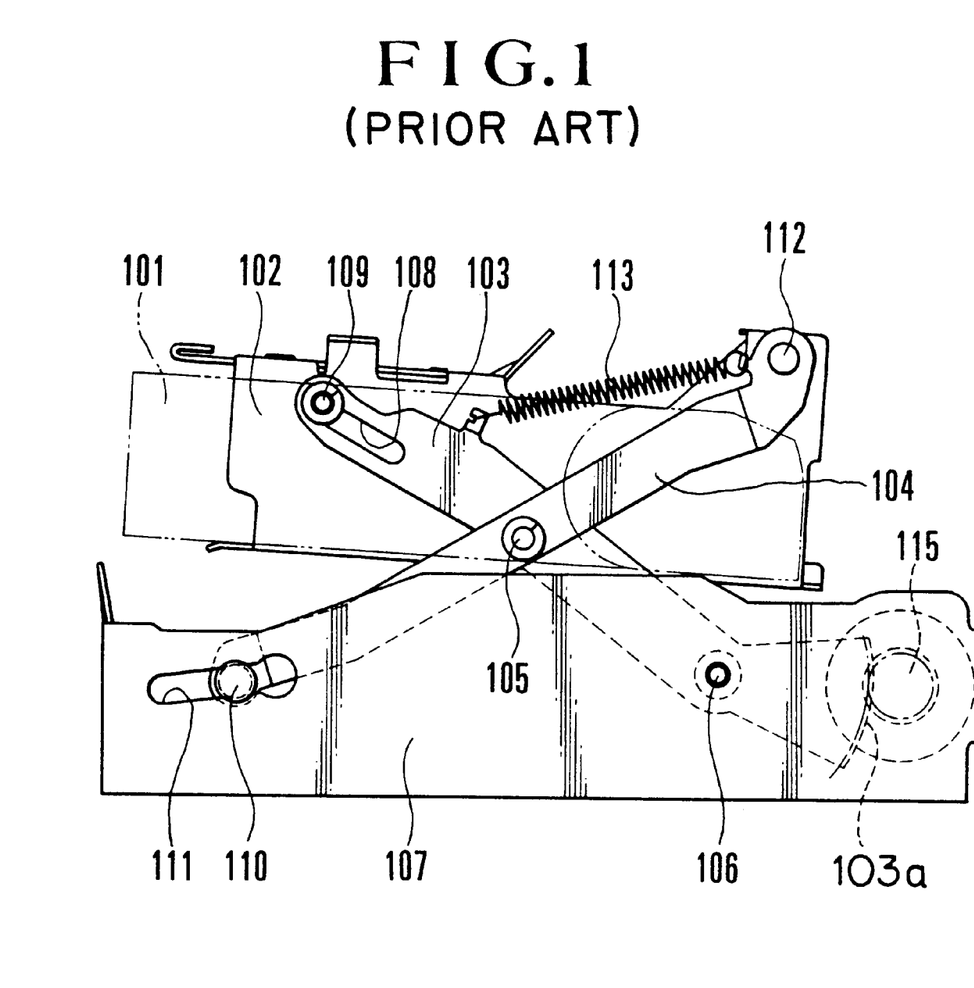
FIG. 1 is a side view showing the conventional cassette loading device.

Referring to FIG. 1 which is a side view of the conventional cassette loading device, a cassette 101 is inserted into a cassette holder 102. A pair of levers 103 and 104 form a link and are rotatably interconnected by a shaft 105. The lever 103 has one end thereof rotatably supported by a chassis 107 through a shaft 106 and the other end thereof slidably engaging a shaft 109 of the cassette holder 102 through a slot 108. The lever 104 has one end thereof slidably engaging a slot 111 of the chassis 107 through a shaft 110 and the other end thereof rotatably supported by the cassette holder 102 by shaft 112. An ascent urging spring 113 stretches between the levers 103 and 104 for urging an upward motion.

When the cassette holder 102 is pushed with the cassette 101 inserted into the cassette holder 102, the link action of the levers 103 and 104 causes the cassette holder 102 to descend. When the cassette holder 102 is unlocked in a descended position, the levers 103 and 104 are operated by the spring 113 to cause the cassette holder 102 to ascend.

In the conventional cassette loading device, a gear 103a is provided at the fore end of the lever 103 on the side of the shaft 106. The gear 103a is in mesh with a damper 115 which is disposed on the chassis 107. When the cassette holder 102 is moved upward by the force of the spring 113, the gear 103a of the lever 103 causes the damper 115 to rotate. The ascent of the cassette holder 102 is smoothed with a load imposed on the ascent by the rotation of the damper 115.

Since the damper 115 is disposed on the side of the shaft 106 which is the center of rotation of the lever 103, the distance between the center of rotation of the gear 103a of the lever 103 and that of the damper 115 is unvarying. Therefore, a torque applied from the damper 115 to the lever 103 remains the same throughout the motion of the cassette holder 102 from its descended position to its ascended position. The torque of the damper 115 is set on the basis of the spring pressure of the spring 113 which is charged when the cassette holder 102 is in its descended position. Therefore, the load on the damper 115 becomes too large in the neighborhood of the ascended position of the cassette holder 102 where the spring pressure becomes weaker.

Further, if the damper 115 is disposed near to the center of rotation of the gear 103a for the purpose of reducing the size of the device, the torque of the damper 115 would increase to necessitate an increase of the distance between the center of rotation of the damper 115 and that of the gear 103a. Therefore, the reduction in size has been difficult. Further, if the lever 103 is made of metal, the gear of the damper 115 might be cut by the gear 103a. To avoid this, it is necessary, for example, to arrange an intermediate gear, which then necessitates an increase in space.

SUMMARY OF THE INVENTION

This invention is directed to the solution of the above-stated problems. It is, therefore, an object of this invention to provide a cassette loading device which is arranged to substantially vary a load by a damper when a cassette holder is in its ascended position and to save space required for the damper and a recording and/or reproducing apparatus which is equipped with the cassette loading device.

To attain this object, an apparatus which is arranged as an embodiment of this invention to record and/or reproduce information on or from a recording medium contained in a cassette includes: a chassis having means for recording and/or reproducing information on or from the recording medium; a cassette holder for holding a cassette; a link mechanism arranged to support the cassette holder in such a way as to move the cassette holder between a first position and a second position relative to the chassis, the link mechanism including a lever arranged to have one end part thereof rotatably supported by one of the chassis and the cassette holder and to have the other end part thereof provided with a gear part and slidably engaging the other of the chassis and the cassette holder, the gear part being composed of at least two gears having different pitch circles; an urging member arranged to urge the cassette holder to move from the first position to the second position; and a damper having a gear part arranged to engage the gear part of the lever.

A cassette loading device which is arranged according to another aspect of this invention includes: a chassis; a cassette holder for holding a cassette; a link mechanism arranged to support the cassette holder in such a way as to move the cassette holder between a first position and a second position relative to the chassis, the link mechanism including a lever arranged to have one end part thereof rotatably supported by one of the chassis and the cassette holder and to have the other end part thereof provided with a gear part and slidably engaging the other of the chassis and the cassette holder, the gear part being composed of at least two gears having different pitch circles; an urging member arranged to urge the cassette holder to move from the second position to the first position; and a damper having a gear part arranged to engage the gear part of the lever.

A cassette loading device which is arranged to improve assembly workability according to this invention includes: a chassis; a cassette holder for holding a cassette; a link mechanism arranged to support the cassette holder in such a way as to move the cassette holder between a first position and a second position relative to the chassis, the link mechanism including a lever arranged to have one end part thereof rotatably supported by one of the chassis and the cassette holder and to have the other end part thereof provided with a gear part and slidably engaging the other of the chassis and the cassette holder; an urging member arranged to urge the cassette holder to move from the second position to the first position; and a damper having a gear part arranged to engage the gear part of the lever.

A cassette loading device which is arranged to stably operate according to this invention includes: a chassis; a cassette holder arranged to hold a cassette; a link mechanism arranged to support the cassette holder in such a way as to move the cassette holder between a first position and a second position relative to the chassis, the link mechanism including a lever arranged to have one end part thereof rotatably supported by one of the chassis and the cassette holder and to have the other end part thereof provided with a gear part; an urging member arranged to urge the cassette holder to move from the second position to the first position; a damper having a gear part arranged to engage the gear part of the lever; a lock lever provided at the cassette holder and arranged to be locked to the chassis when the cassette holder is in the first position; and a restricting part arranged to restrict a free movement of the lock lever when the cassette holder is in the second position.

The above and further objects and features of this invention will become apparent from the following detailed description of embodiments thereof taken in connection with the accompanying drawings.

DETAILED DESCRIPTION OF THE PREFERRED EMBODIMENTS

Figure 2:
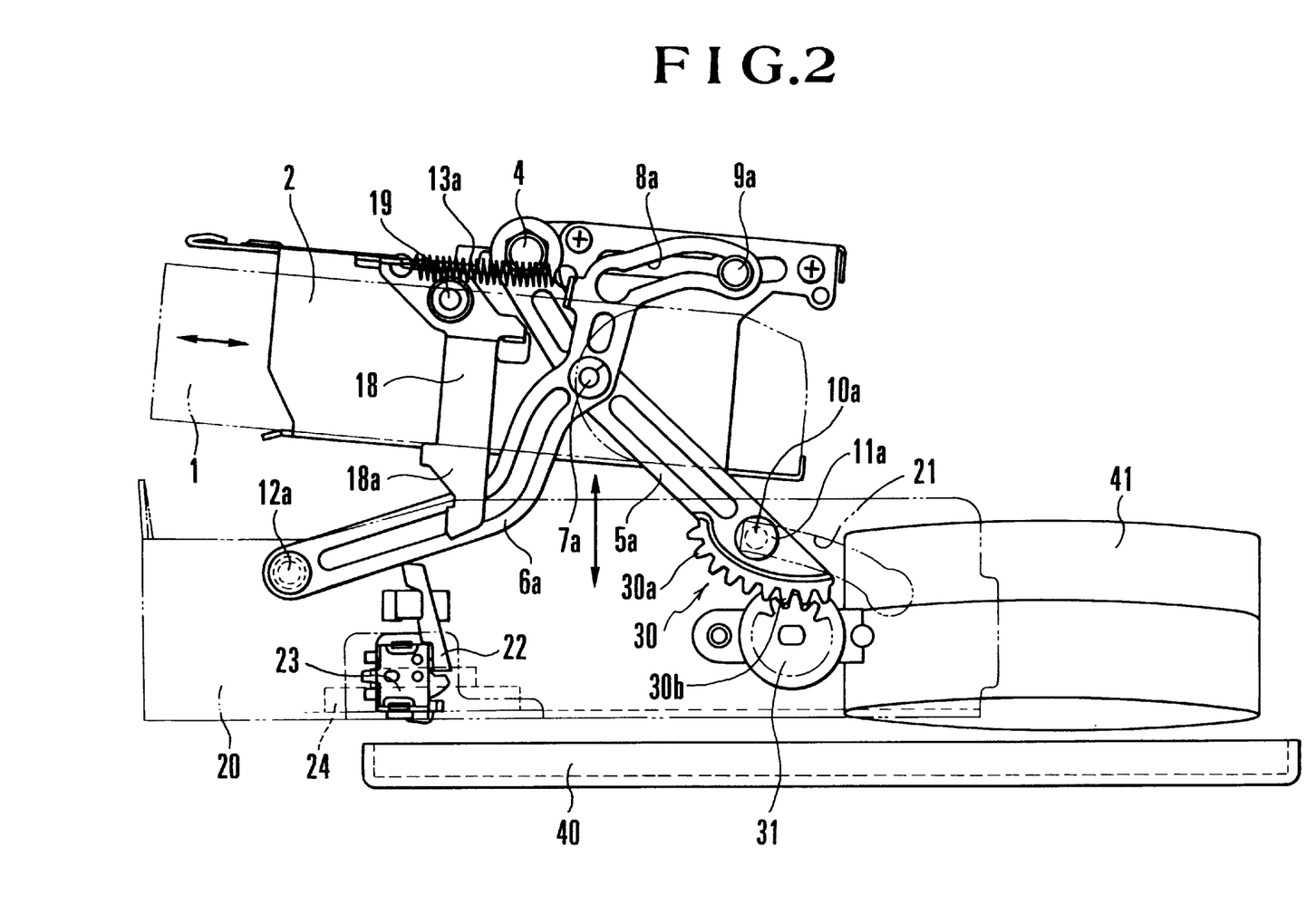
FIG. 2 is a side view of a VTR equipped with a cassette loading device arranged as an embodiment of this invention and shows the cassette loading device in a state of having a cassette holder in an ascended position.
Figure 3:
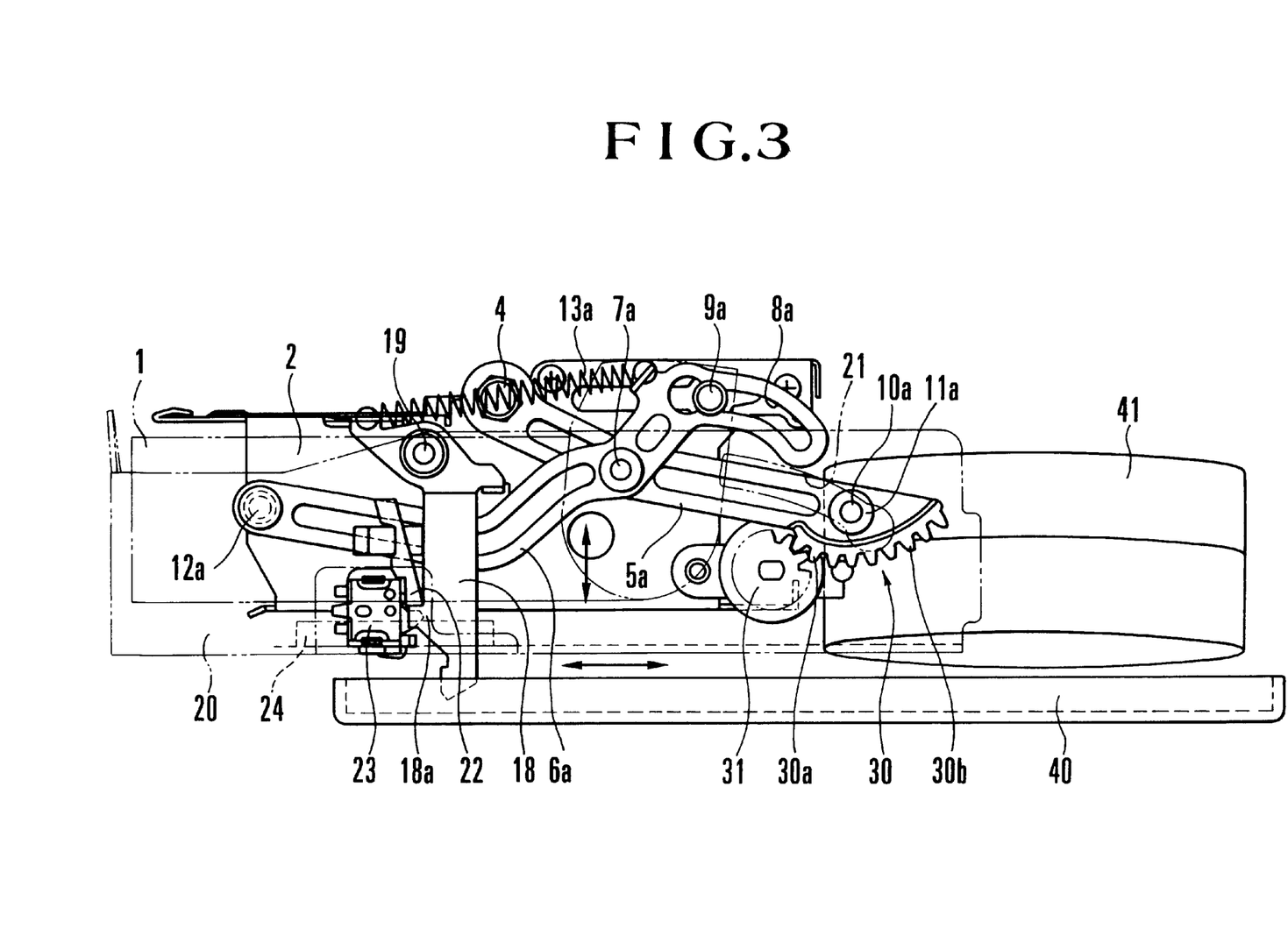
FIG. 3 is a side view of the VTR of the same embodiment showing the cassette loading device thereof in a state of having the holder in a descended position.
Figure 4:
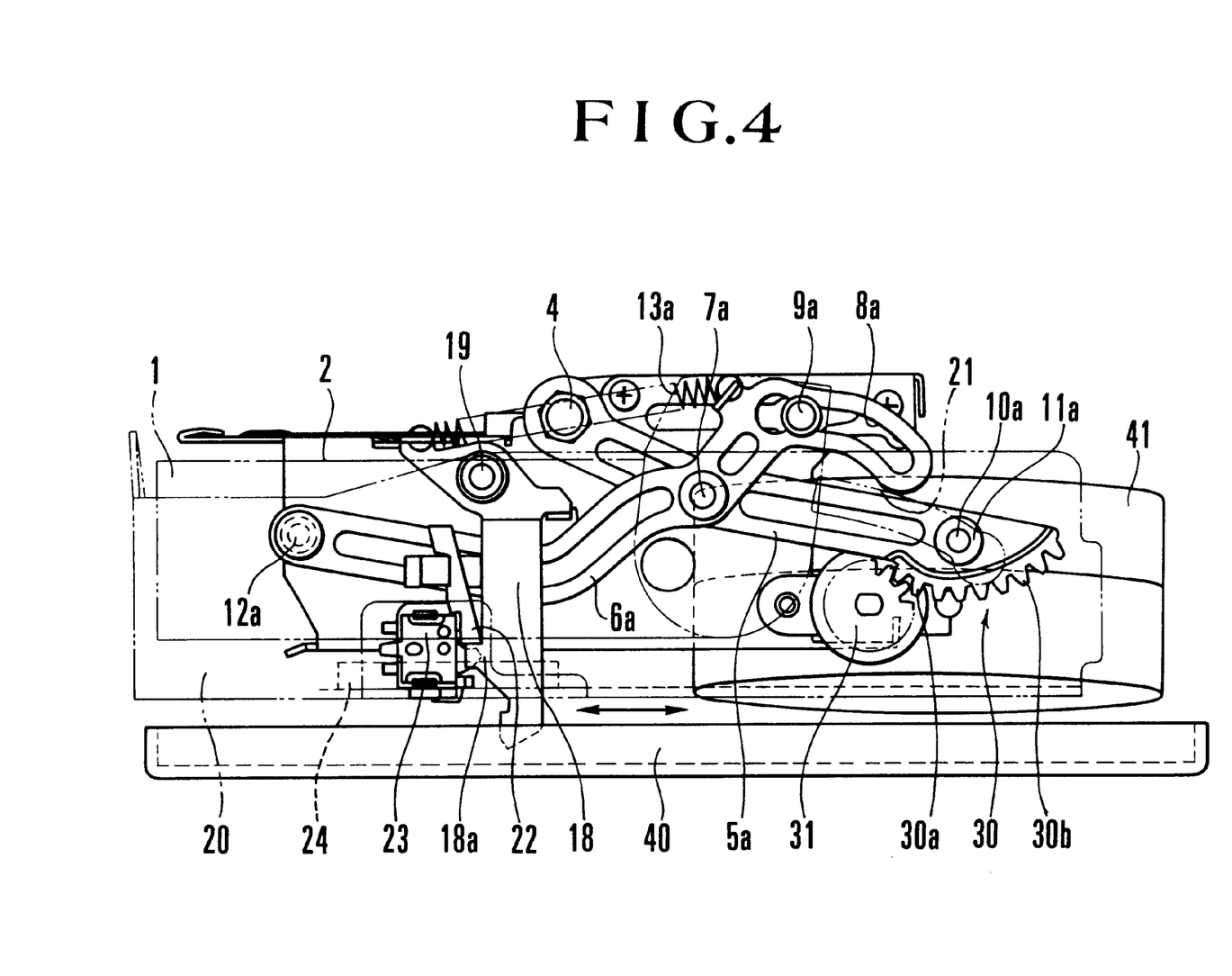
FIG. 4 is a side view of the same embodiment showing the VTR as in a recording or reproducing state obtained with a movable base plate having been moved.
Figure 5:
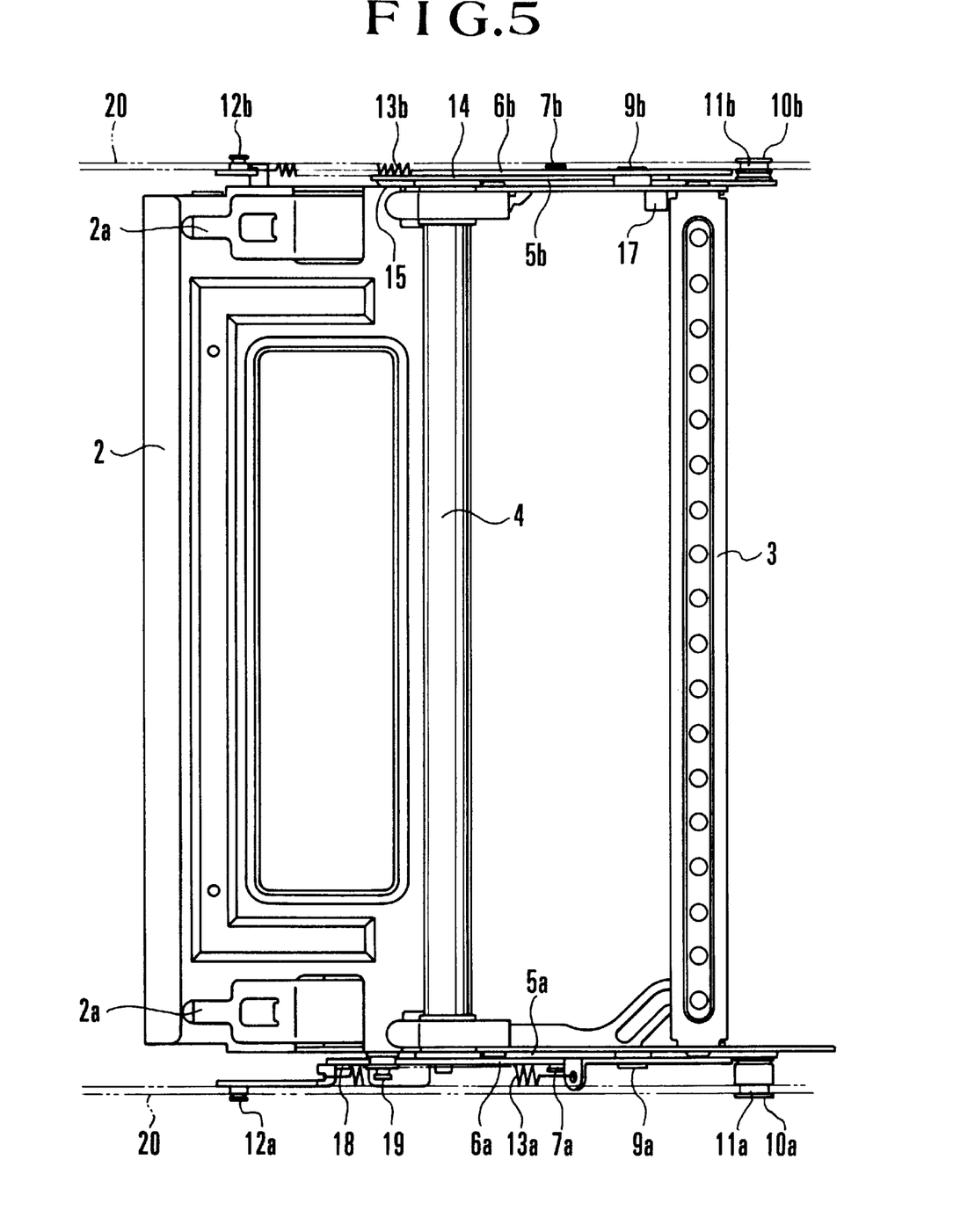
FIG. 5 is a plan view showing the cassette loading device of the same embodiment.
Figure 6:
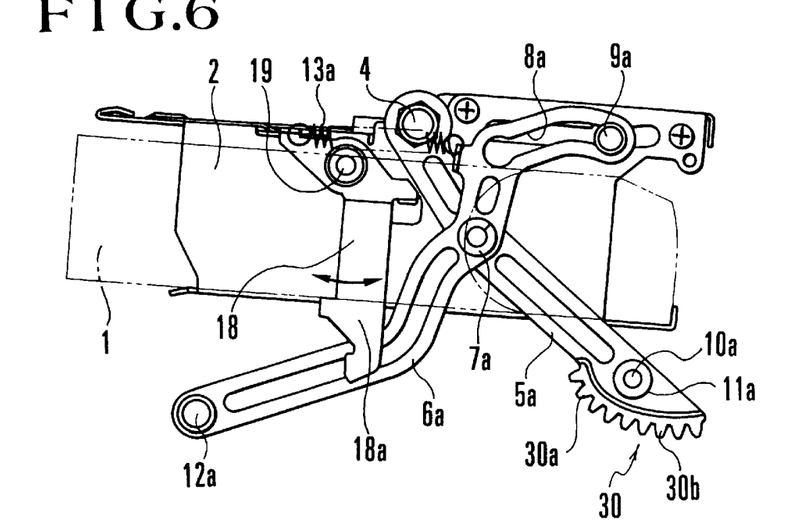
FIG. 6 is a side view of the cassette loading device of the same embodiment taken from one side of it.
Figure 7:
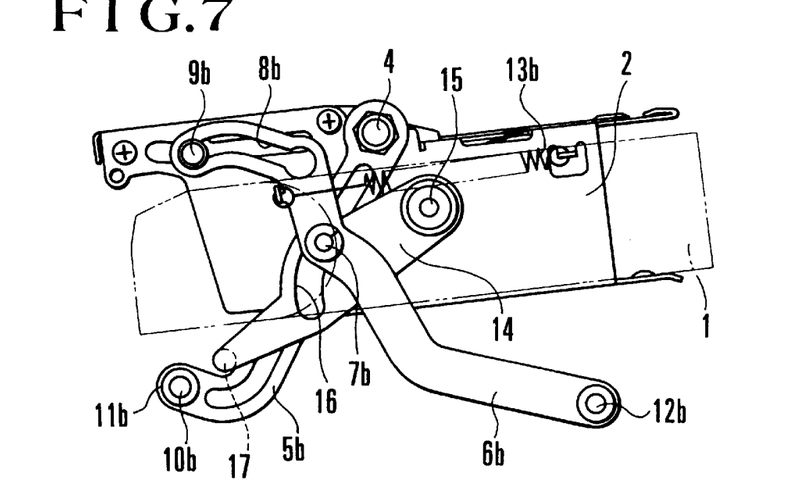
FIG. 7 is a side view of the cassette loading device of the same embodiment taken from the other side.
Figure 8:
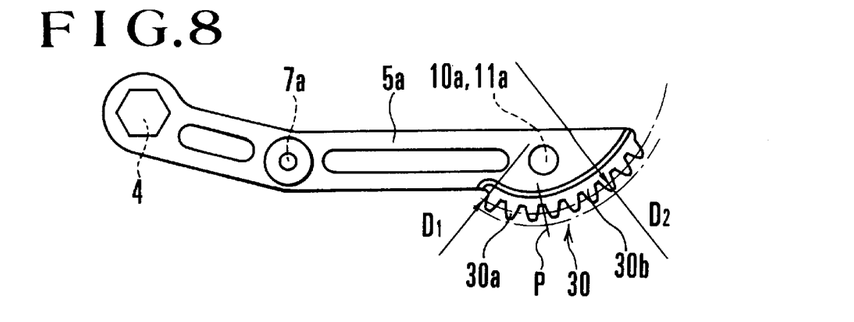
FIG. 8 is a side view showing a lever arranged in the same embodiment to have first and second gears.

The following describes a VTR arranged as an embodiment of this invention with reference to FIGS. 2 to 8. Of these drawings, FIGS. 2 to 4 are side views of the VTR which is equipped with a cassette loading device arranged according to this invention. FIG. 5 is a plan view of the cassette loading device. FIG. 6 is a side view of the cassette loading device taken from one side of it. FIG. 7 is a side view of the same cassette loading device taken from the other side of it. FIG. 8 is a side view of a lever which is provided with first and second gears.

Referring to FIGS. 5 to 7, a cassette 1 is inserted into a cassette holder 2. A reinforcement beam 3 is arranged to connect the two side plates of the cassette holder 2. A pair of levers 5a and 6a jointly form a link on one side. Another pair of levers 5b and 6b jointly form a link on the other side. A shaft 4 is arranged to connect one end of the lever 5a and one end of the lever 5b and to have them rotatably supported by the side plates of the cassette holder 2. Shafts 7a and 7b are arranged to rotatably connect the lever 5a to the lever 6a and the lever 5b to the lever 6b, respectively. Cam slots 8a and 8b are formed in one end parts of the levers 6a and 6b, respectively. Shafts 9a and 9b which are provided on the side plates of the cassette holder 2 slidably engage the cam slots 8a and 8b, respectively.

Referring to FIGS. 2 to 4, a movable base plate 20 is arranged as a sub-chassis. Shafts 10a and 10b are respectively provided at the other end parts of the levers 5a and 5b. Rollers 11a and 11b which are provided respectively on the shafts 10a and 10b are arranged to rotate and move within cam grooves 21 which are formed in the side plates of the movable base plate 20. Shafts 12a and 12b which are provided respectively on the other ends of the levers 6a and 6b are rotatably supported by the side plates of the movable base plate 20.

Springs 13a and 13b are arranged to urge the cassette holder 2 to move toward its ascended position. The spring 13a is stretched between the lever 6a and a lock lever 18. The other spring 13b is stretched between the lever 6b and the side plate of the cassette holder 2.

Referring to FIG. 7, a lever 14 for opening the lid of the cassette 1 is rotatably attached to the side plate of the cassette holder 2 through a shaft 15. The lever 14 is provided with a cam slot 16 and a lid opening pin 17. The shaft 7b mentioned above is fitted in the cam slot 16. The lever 14 is thus arranged to swing clockwise accordingly as the cassette holder 2 descends, and then the pin 17 opens the lid of the cassette 1.

Referring to FIG. 6, the lock lever 18 is rotatably attached to the side plate of the cassette holder 2 through a shaft 19. The spring 13a which is locked to one end of the lock lever 18 urges the lock lever 18 to swing clockwise. As shown in FIGS. 2 to 4, a lock member 22 and a lock detection switch 23 are provided on one side plate of the movable base plate 20. A locking part 18a of the lock lever 18 is arranged to engage the lock member 22 and to push the lock detection switch 23 at the same time.

A gear part 30 is provided integrally with the above-stated lever 5a on the sliding engagement side of the lever 5a as shown in FIGS. 2 to 4 and 6. The gear part 30 is in mesh with a damper 31 which is provided on the side plate of the movable base plate 20. The damper 31 is arranged to impose a load on the ascent of the cassette holder 2 by the viscous resistance of oil contained therein in such a way as to smoothen the upward motion of the cassette holder 2.

As shown in FIG. 8, the gear part 30 which is provided on the lever 5a is composed of a first gear 30a and a second gear 30b. The first gear 30a has a pitch circle of a diameter D1 and the second gear 30b a pitch circle of a diameter D2. The pitch circle diameter D1 is smaller than the pitch circle diameter D2. The boundary between the first and second gears 30a and 30b is located at a center position P of a trough between the two gears while the size and the shape of the two gears 30a and 30b are identical with each other. The lever 5a is arranged such that the second gear 30b is in mesh with the damper 31 when the cassette holder 2 is in its ascended position, as shown in FIG. 2, and the first gear 30a is in mesh with the damper 31 when the cassette holder 2 is in its descended position as shown in FIG. 3.

As shown in FIGS. 2, 3 and 4, the movable base plate 20 is provided with a reel mount 24 which is arranged to have the cassette 1 mounted thereon. The movable base plate 20 is slidable back and forth over a fixed base plate 40 which is a main chassis. A rotary drum unit 41 is disposed aslant on the fixed base plate 40.

When the cassette holder 2 is pushed from above after the cassette 1 is inserted into it, as shown in FIG. 2, the cassette holder 2 begins to descend with the roller 11'aof the lever 5a and the cam slot 8a of the lever 6a respectively moving along the cam slot 21 of the movable base plate 20 and the shaft 9a of the holder 2.

While the cassette holder 2 is making the descent, the locking part 18a of the lock lever 18 comes to abut on the lock member 22 of the movable base plate 20. The lock lever 18 then swings counterclockwise to charge the spring 13a. The spring 13a is released from the charged state when the locking part 18a passes an angular part of the lock member 22. The lock lever 18 is then caused to swing clockwise to have the locking part 18a locked to the lock member 22. At the same time, the locking part 18a pushes the lock detection switch 23. The cassette holder 2 is thus locked in its descended position as shown in FIG. 3. Under this condition, the cassette 1 which is within the cassette holder 2 is mounted on the reel mount 24 of the movable base plate 20. The cassette 1 is then pushed by a cassette retaining spring 2a which is disposed on the upper plate of the cassette holder 2, as shown in FIG. 5.

Figure 12:
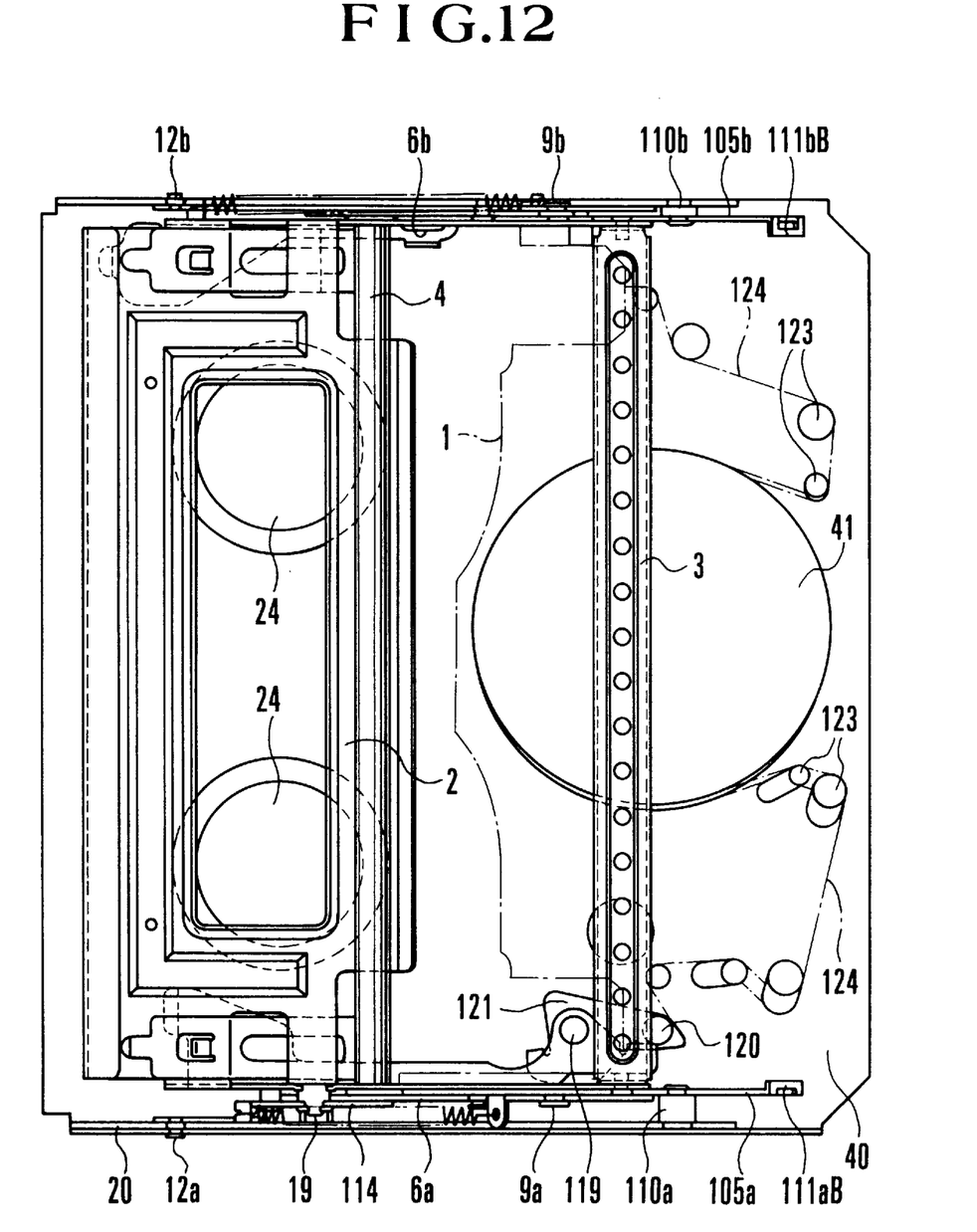
FIG. 12 is a plan view of the second embodiment showing the VTR in a recording or reproducing state obtained with a movable base plate having been moved.
Figure 13:
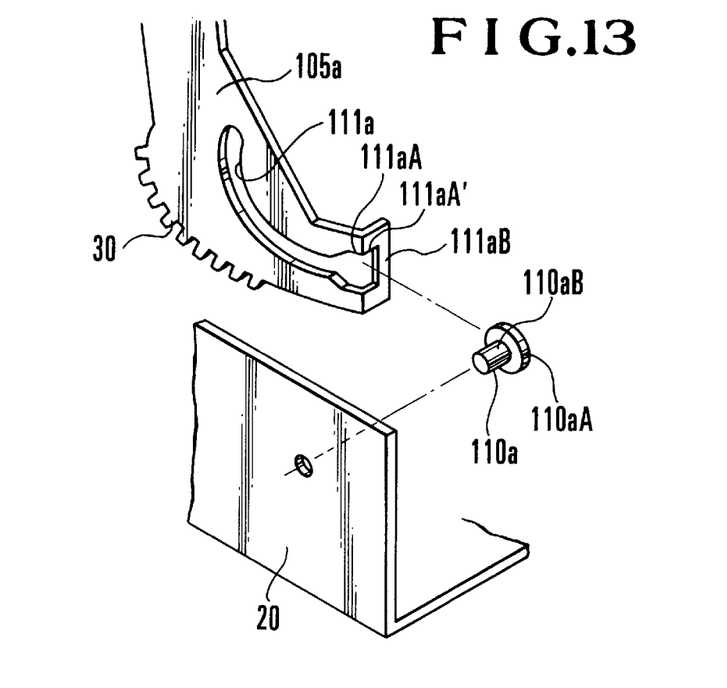
FIG. 13 is an exploded oblique view of the second embodiment showing the sliding engagement parts of a link mechanism and a chassis.
Figure 14:
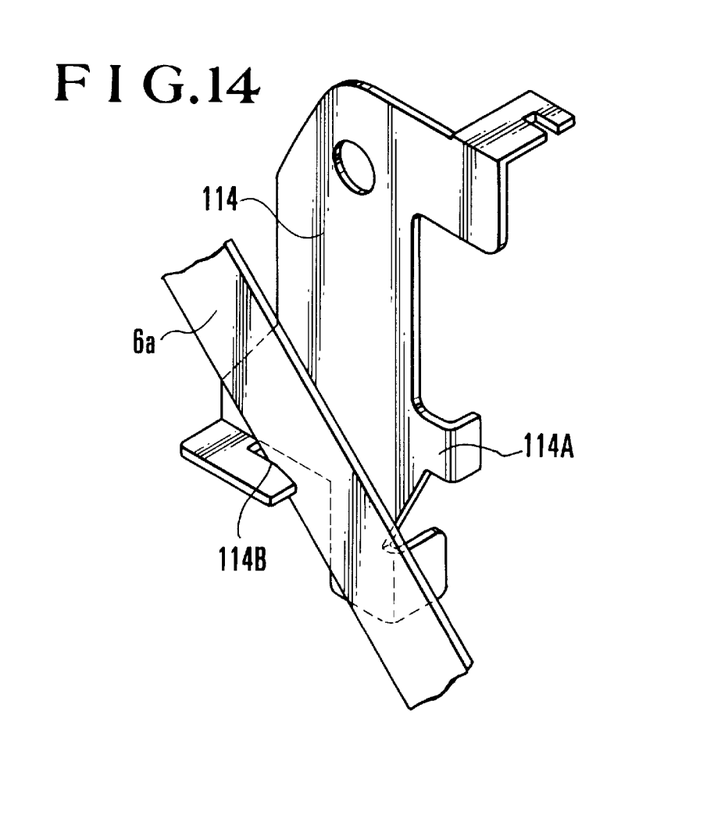
FIG. 14 is an oblique view of the second embodiment showing a restricting part of a lock lever and a lever of the link mechanism.

With the lock detection switch 23 pushed as mentioned above, it turns on. Then, as shown in FIG. 4, the movable base plate 20 is slid relative to the fixed base plate 40 toward the rotary drum unit 41. As a result, a part of the rotary drum unit 41 is inserted into the opening part of the cassette 1 as the lid of the cassette 1 has been open. With the rotary drum unit 41 inserted, a tape guide 123, etc., jointly act to pull a tape 124 out from inside of the cassette 1, as shown in FIG. 12. The tape 124 is helically wrapped around the circumferential surface of the drum of the rotary drum unit 41 and a tape path is formed in a predetermined shape. Recording or reproduction is performed as desired on or from the tape 124 by means of a rotary head, etc., by allowing the tape 124 to travel.

When an instruction is given for ejection, the movable base plate 20 is caused to slide in the direction of parting from the rotary drum unit 41, and the tape 124 is unloaded, as shown in FIGS. 4 and 3. Referring to FIG. 3, when the cassette holder 2 is unlocked with the lock lever 18 swung counterclockwise, the levers 5a and 6a are caused by the force of the spring 13a to act reversely to the manner described in the foregoing, as shown in FIGS. 3 and 2. The cassette holder 2 then makes an ascent to enable the cassette 1 to be taken out from the cassette holder 2.

While the cassette holder 2 is ascending, the damper 31 is rotated and operated through the first and second gears 30a and 30b of the lever 5a accordingly as the lever 5 moves. When the cassette holder 2 is in the initial stage of its ascent in the neighborhood of its descended position as shown in FIG. 3, the springs 13a and 13b which are provided for the ascent of the cassette holder 2 are still in a state of being strongly charged, so that the cassette holder 2 is urged to quickly ascend. Then, against the urging force, since the damper 31 is in mesh with the first gear 30a which has the pitch circle diameter D1, a high speed of the ascent of the cassette holder 2 can be mitigated by the torque of the damper 31.

When the cassette holder 2 comes nearer to its ascended position as shown in FIG. 2, the damper 31 comes to intermesh with the second gear 30b instead of intermeshing with the first gear 30a. Since the pitch circle diameter D2 of the second gear 30b is larger than the pitch circle diameter D1 of the first gear 30a, the load of the damper 31 imposed on the lever 5a decreases. Therefore, the ascent of the cassette holder 2 can be smoothly carried out by virtue of the decrease of the load even when the charging forces of the springs 13a and 13b become weaker near the end of the ascent.

The damper 31 can be positioned close to the sliding engagement part of the lever 5a without unnecessarily increasing the torque of the damper 31. Therefore, a space required for arranging the damper 31 can be reduced for compact arrangement of the device. Since the gear part 30 which is arranged to mesh with the damper 31 is disposed on the sliding engagement side of the lever 5a, the damper 31 can be arranged to have a larger angle of rotation by virtue of sliding of the gear part 30 of the lever 5a. Therefore, a larger damper effect is attainable with a smaller load, so that spring pressure can be reduced to lessen the pressure of locking the holder 2.

In this embodiment, the cam slots 21 provided for slidable engagement of the levers 5a and 5b are arranged in a shape having two symmetrical curvatures according to the variations in shape and pitch circle diameter of the first and second gears 30a and 30b of the lever 5a. This arrangement not only smoothens the sliding motions of the levers 5a and 5b taking place while the damper 31 is rotated, but also permits machining work on the cam slots 21 to be easily carried out according to the curvatures of the first and second gears 30a and 30b.

Further, in the case of this embodiment, the upper cam slots 8a and 8b for slidable engagement of the levers 6a and 6b are arranged in an arc shape extending in about the same direction as the lower cam slots 21. That arrangement not only permits the device to have a compact shape, without causing the sliding sides of the levers 6a and 6b to protrude upward from the cassette holder 2, but also makes cassette inserting and taking-out operations easier by arranging the front end of the cassette holder 2 to be at a lower height when the cassette holder 2 is in its ascended position.

While one embodiment of this invention has been described, this invention is not limited to what has been described. The embodiment may be variously changed and modified according to the technological concept of this invention. For example, the arrangement of having the gears of the lever disposed on one side of the lever where the lever slidably engages the chassis may be changed to have the gears disposed on the other side of the lever where the lever slidably engage the cassette holder and to arrange the damper on the cassette holder. Further, in the embodiment, the gears of the lever are arranged to be two gears of different pitch circles. However, the two gears may be replaced either with three or more gears which have their pitch circles different stepwise from each other or with some gear that is arranged to have its pitch circle varying in a stepless manner.

A second embodiment of this invention which is an improvement over the first embodiment is described as follows. In the second embodiment, the improvement is made particularly in the shape of the link mechanism with respect to facilitation of assembly work and in the lock mechanism for a stable operation.

The parts of the second embodiment arranged in the same manner as those of the first embodiment are described with the same reference numerals, and details of them are omitted from the following description.

Referring to FIGS. 9 to 13, shafts 110a and 110b are arranged on the side plates of the movable base plate 20 to slidably engage cam slot 111a and the cam slot (not shown) provided in levers 105a and 105b which correspond respectively to the levers 5a and 5b of the first embodiment described in the foregoing. The following description is given with respect to only the lever 105a, because the other lever 105b is arranged in the same manner as the lever 105a.

The cam slot 111a of the lever 105a includes a wide part 111aA which is formed at the fore end of the slot 111a for insertion. The cam slot 111a further includes a bent part 111aB which is formed also at the fore end of the slot 111a. Thus, the wide part 111aA continues from the bent part 111aB through a wide part 111aA'. The wide part 111aA is on the same plane as a narrower part of the cam slot 111a while the wide part 111aA' is not on the same plane. In mounting the cassette holder 2 on the movable base plate 20, the shaft 110a is caused to engage the wide parts 111aA and 111aA' of the cam slot 111a to make the shaft 110a and the cam slot 111a to be slidable relative to each other. The fore end of the other lever 105b is also formed in the same shape as the lever 105a bent portion 111bB thereof being shown in FIG 12.

Figure 9:
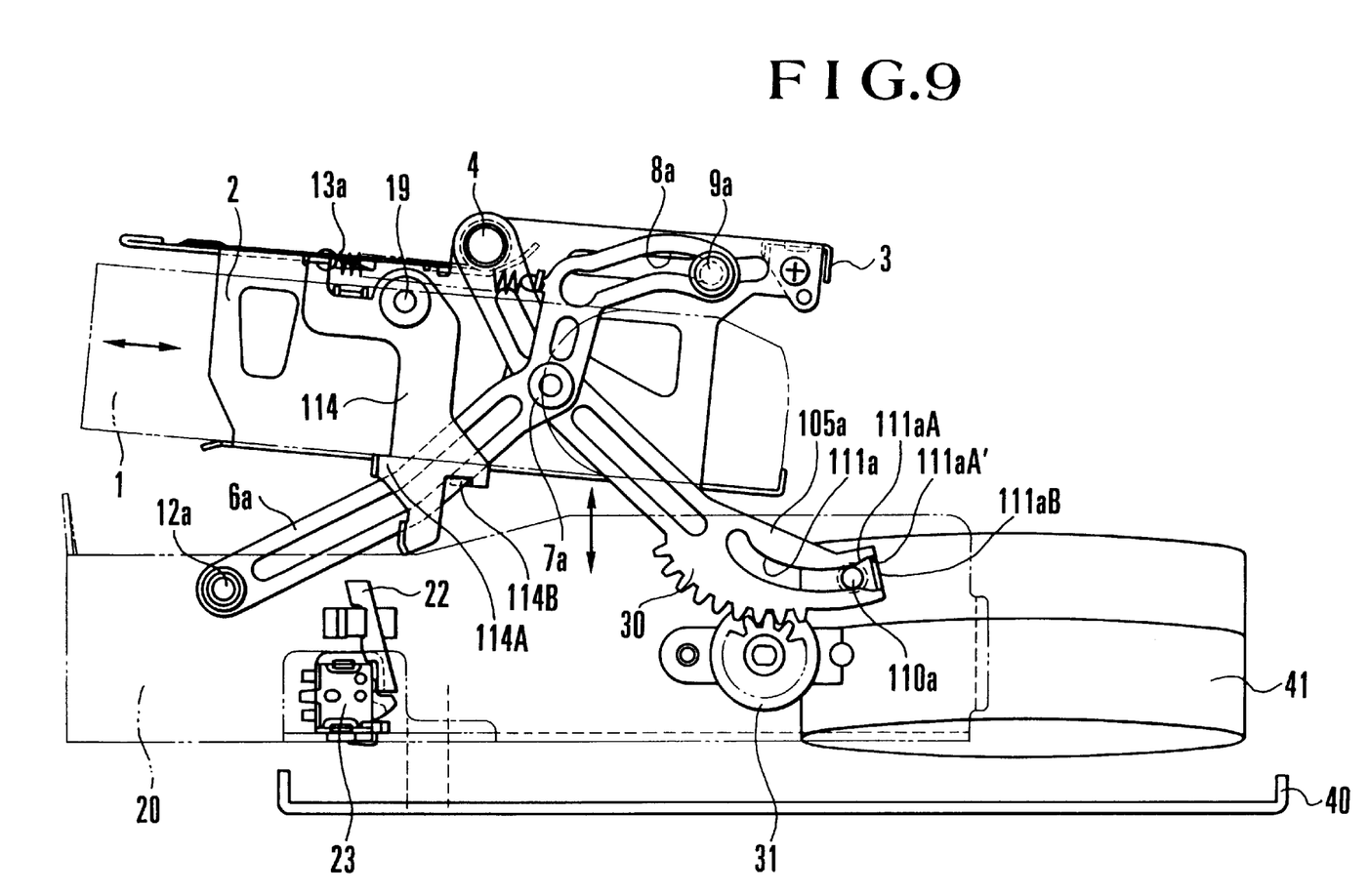
FIG. 9 is a side view of a VTR having a cassette loading device arranged as a second embodiment of this invention and shows the VTR in a state of having a cassette holder in an ascended position.
Figure 10:
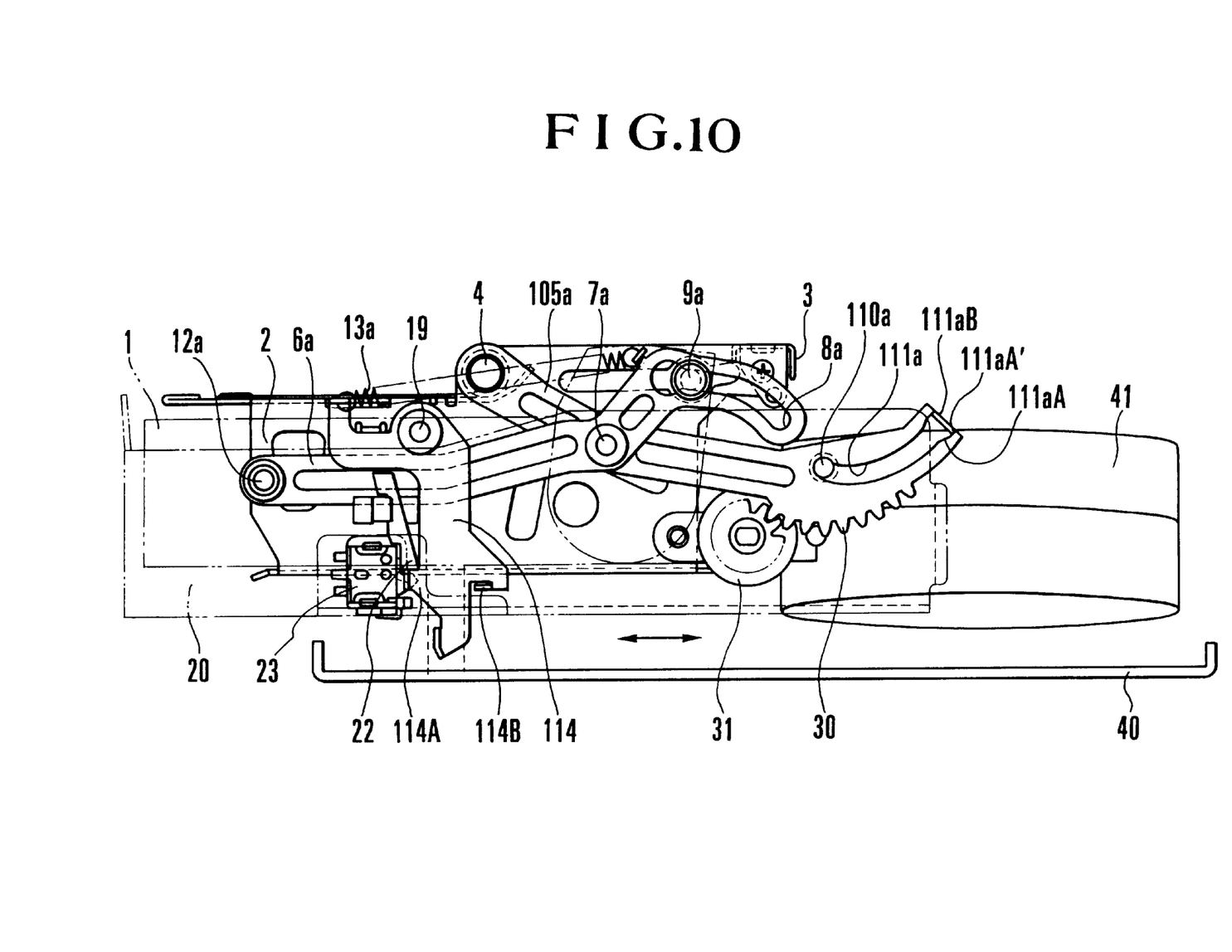
FIG. 10 is a side view of the VTR of the second embodiment showing the holder in a descended position.

With the device arranged in the above-stated manner, in mounting the cassette holder 2 on the movable base plate 20 while the cassette holder 2 is in its ascended state as shown in FIG. 9, a large diameter part 110aA and a small diameter part 110aB of the shaft 110a are caused to engage respectively the wide parts 111aA' and 111aA of the cam slot 111a of the lever 105a to make the small diameter part 110aB of the shaft 110a to be slidable within the cam slot 111a. In other words, the cassette holder 2 can be mounted on the movable base plate 20 from one side without warping the lever 105a inward in carrying out assembly work.

Figure 11:
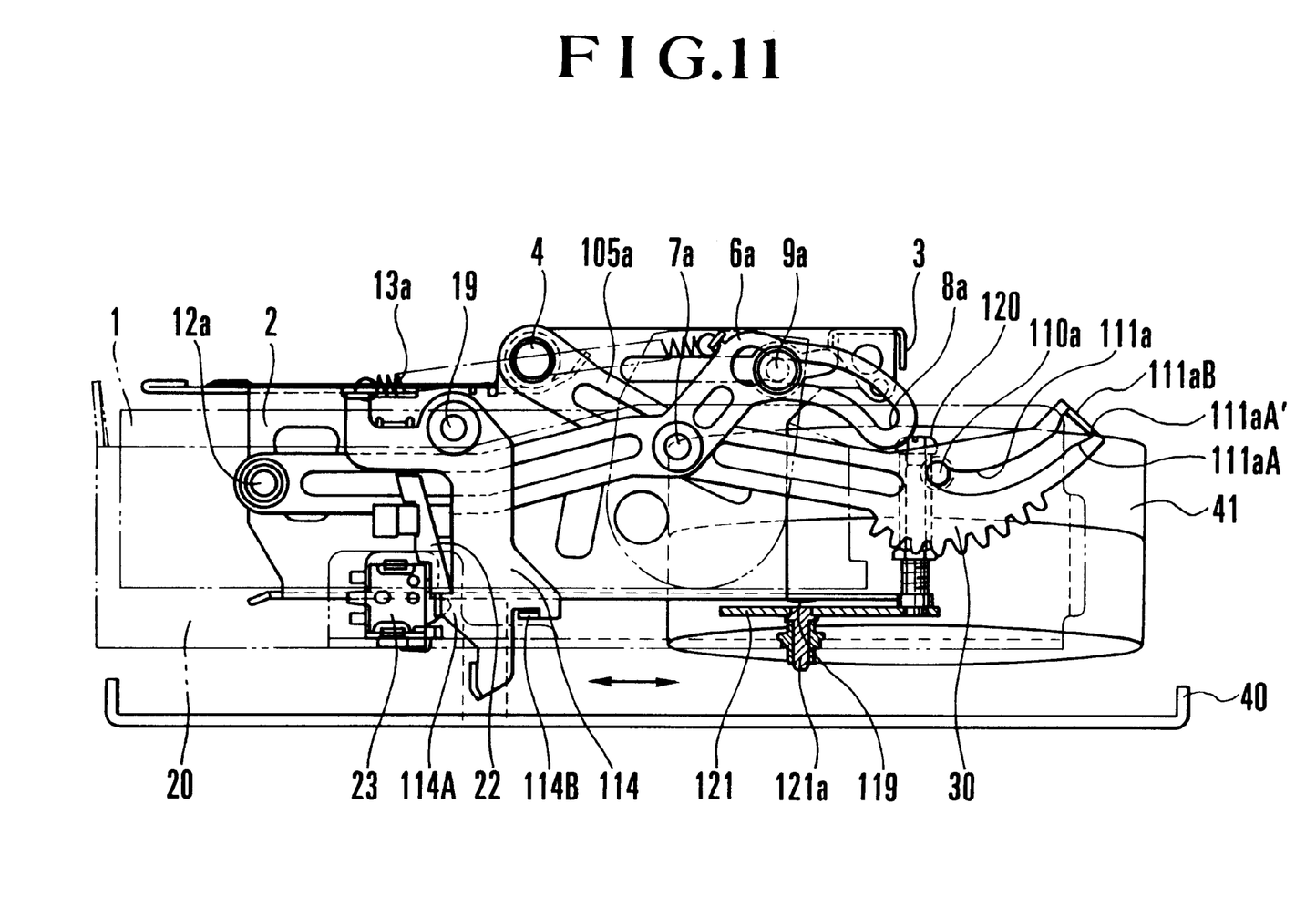
FIG. 11 is a side view of the second embodiment showing the VTR in a recording or reproducing state obtained with a movable base plate having been moved.

When the cassette holder 2 is in its descended state as shown in FIG. 11, the arrangement of forming the fore end part of the lever 105a in the bent shape enables the fore end 111aB of the lever 105a to protrude from the movable base plate 20 to a less extent, so that the device can be compactly arranged. It is of course possible to arrange the device to have the fore end of the lever 105a not protruding at all. The bent part 111aB also enhances the strength of the lever 105a.

Figure 15:
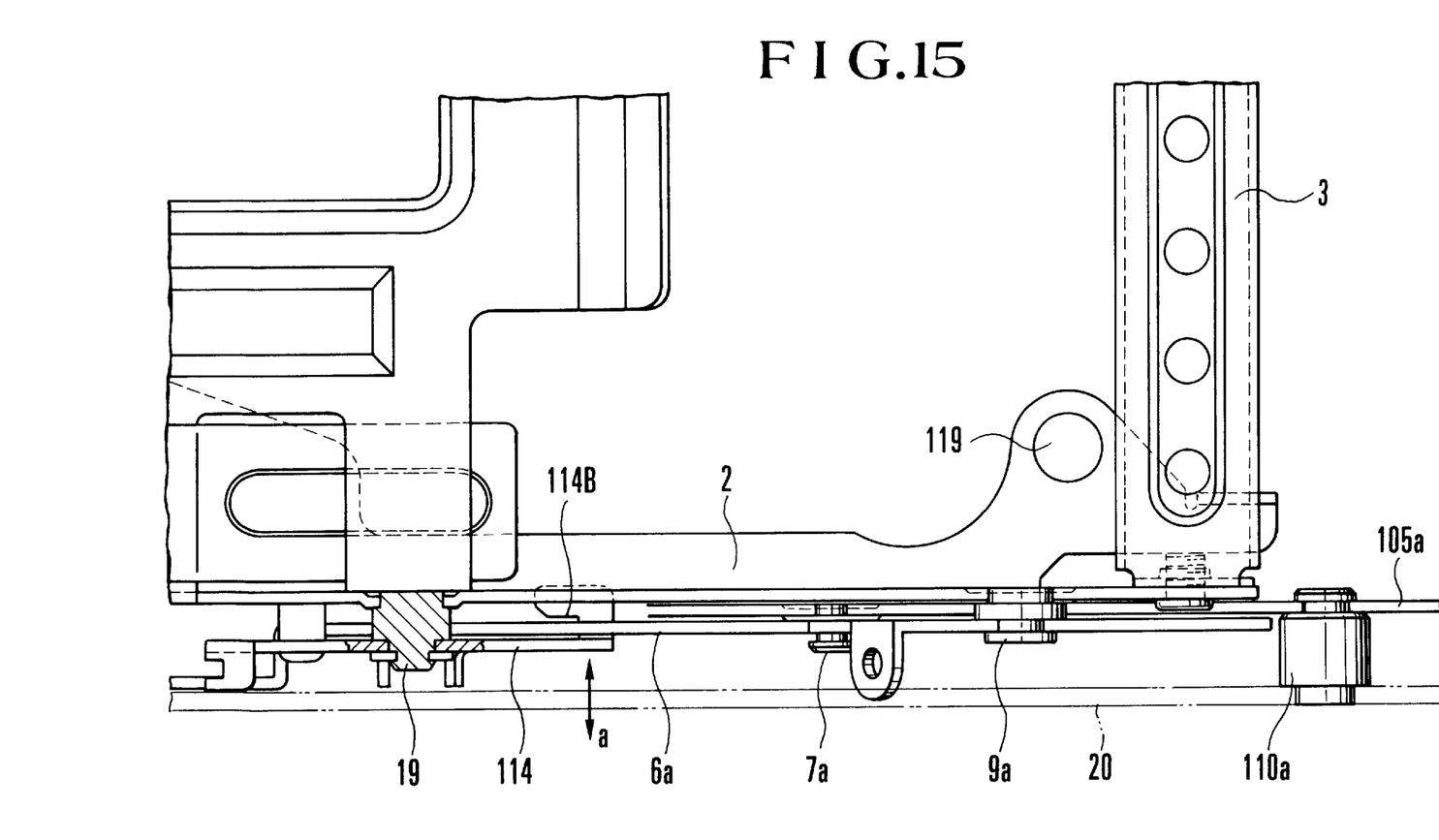
FIG. 15 is an enlarged view of essential parts of the cassette loading device of the second embodiment.

As shown in FIGS. 9 to 12 and 14, a lock lever 114 is provided with a locking part 114A and with a restricting part 114B which is arranged to restrict a free movement of the lock lever 114 in the directions of arrow "a" (see FIG. 15). When the cassette holder 2 ascends, the lever 6a is pinched by the restricting part 114B, so that a free movement of the lock lever 114 can be restricted.

When the cassette holder 2 is in its ascended state as shown in FIG. 9, the lever 6a is pinched by the restricting part 114B of the lock lever 114 to allow the play of the lock lever 114 only within a limited range. Even while the cassette holder 2 is in process of its descent, therefore, the lock lever 114 never unstably acts in such a manner as to interfere the movable base plate 20 or to come in between the lever 6a and the side plate of the movable base plate 20.

Referring to FIG. 15, the shaft 19 is fitted into the lock lever 114 only in the plate thickness part of the lock lever 114 and thus leaves a large amount of latitude to the lock lever 114. Therefore, the swinging action of the lock lever 114 never becomes unstable even when some lateral pressure is applied to the lock lever 114 in the direction of arrow "a". Since no additional part such as a bushing is used for the fitting engagement of the shaft 19, the arrangement permits reduction in cost as the number of necessary parts is reduced.

As shown in FIGS. 11, 12 and 15, an embossed part 119 is formed at the bottom plate of the cassette holder 2 to extend toward the movable base plate 20. The embossed part 119 is on the same axis as the center 121a of rotation on the movable base plate 20 of an arm 121 on which a tape guide post 120 is mounted. The embossed part 119 thus enables the device to stably operate even when a pressure is applied to the device from above during the movement of the movable base plate 20 or during the loading operation of the tape guide post 120. Further, with the arm 121 arranged to have the center 121a of rotation coincide with the axis of the embossed part 119, no unnecessary moment will be exerted on the arm 121 during the recording or reproducing operation, so that the tape can be transported in a stable manner.

As described above, the second embodiment which is an improvement over the first embodiment has sliding engagement parts each of which consists of a cam slot and a shaft and is arranged to allow a link mechanism to slidably engage the chassis. In the sliding engagement part, a wide part is included in the cam slot. The wide part consists of two parts. While one part is on the same plane as a narrow part of the cam slot, the other part is on a plane which differs from the plane of the narrow slot part. This arrangement facilitates the assembly work of mounting the cassette holder on the chassis as it permits causing the shaft to engage the cam slot, for example, without warping the link inward. Further, with the bent part formed at one end of the cam slot, the link mechanism can be compactly arranged to permit reduction in size of the whole device.

The restricting part which is arranged on the cassette holder to restrict a free movement of the lock lever serves to stabilize the action of the lock lever while the cassette holder is in process of descent, to permit reduction in size and weight of the device and to reduce the number of necessary parts for reduction in cost. Further, with the link arranged to engage the restricting part of the lock lever, a free movement of the lock lever can be effectively restricted with a very simple arrangement.

In the case of the cassette loading device of the embodiment described, the shaft is disposed on the side of the chassis and the cam slot on the side of the lever of the cassette holder. However, a converse arrangement is possible to have the shaft on the side of the lever and the cam slot on the side of the chassis.

In the cassette loading device, the restricting part which is provided for restricting a free movement of the lock lever is arranged on the lock lever. However, the same purpose can be attained also by arranging the restricting part on the side of the lever instead of the lock lever.

In each of the embodiments described, the VTR is arranged to include the movable chassis, or the movable base plate. The VTR, however, may be arranged to include only a fixed chassis like in the case of an ordinary recording and/or reproducing apparatus.

What is claimed is:

1. A cassette loading device, comprising:
    a) a chassis;
    b) a cassette holder for holding a cassette;
    c) a link mechanism arranged to support said cassette holder in such a way as to move said cassette holder between a first position and a second position relative to said chassis, said first position being a descended position of said cassette and said second position being an ascended position of said cassette, said link mechanism including a lever arranged to have one end part thereof rotatably supported by one of said chassis and said cassette holder;

d) an urging member arranged to urge said cassette holder to move from the first position to the second position;

e) a damper providing a load to movement of said link mechanism in its movement of said cassette holder; and f) gear means for coupling said lever to said damper, said gear means effecting variable damping of movement of said cassette holder movement by said damper, said gear means being composed of at least first and second gears having different pitch circles and being continuously formed and wherein the pitch circle diameter of said first gear that engages said damper when said cassette holder is in the first position is D1 and the pitch circle diameter of said second gear that engages said damper when said cassette holder is in the second position is D2, and said first and second gears are arranged to be in relation of D1<D2.

2. An apparatus for recording and/or reproducing information on and/or from a recording medium contained in a cassette, comprising:

a) a chassis having means for recording and/or reproducing information on and/or from the recording medium;

b) a cassette holder for holding said cassette;

c) a link mechanism arranged to support said cassette holder in such a way as to move said cassette holder between a first position and a second position relative to said chassis, said first position being a descended position of said cassette and said second position being an ascended position of said cassette, said link mechanism including a lever arranged to have one end part thereof rotatably supported by one of said chassis and said cassette holder and to have the other end part thereof provided with a gear part and slidably engaging the other of said chassis and said cassette holder, said gear part being composed of at least first and second gears having different pitch circles and being continuously formed;

d) an urging member arranged to urge said cassette holder to move from the first position to the second position;

e) a damper having a gear part arranged to engage the gear part of said lever; and wherein the pitch circle diameter of said first gear that engages said damper when said cassette holder is in the first position is D1 and the pitch circle diameter of said second gear that engages said damper when said cassette holder is in the second position is D2, said first and second gears are arranged to be in a relation of D1<D2.

3. An apparatus according to claim 1, further comprising a sliding mechanism provided with a cam slot and a shaft for allowing said lever to slide.

4. An apparatus according to claim 3, wherein said cam slot includes a wide part in addition to a narrow part, and said wide part is formed partly on the same plane as said narrow part and partly on a different plane.

5. An apparatus according to claim 4, wherein said cam slot is formed in said lever, and a part of said wide part formed on the different plane is formed in an end part of said lever as a bent part of said lever.

6. An apparatus according to claim 3, wherein said cam slot is formed in said lever, and said shaft is disposed on said chassis.

7. An apparatus according to claim 3, wherein said cam slot is formed in said chassis, and said shaft is disposed on said lever.

8. An apparatus according to claim 1, wherein said cassette holder includes a lock lever arranged to be locked to said chassis when said cassette holder is in the first position.

9. An apparatus according to claim 8, further comprising a restricting part arranged to restrict a free movement of said lock lever when said cassette holder is in the second position.

10. An apparatus according to claim 9, wherein said restricting part is disposed on said lock lever and is arranged to engage said lever of said link mechanism.

11. A cassette loading device comprising:

a) a chassis;

b) a cassette holder for holding a cassette;

c) a link mechanism arranged to support said cassette holder in such a way as to move said cassette holder between a first position and a second position relative to said chassis, said first position being a descended position of said cassette and said second position being an ascended position of said cassette, said link mechanism including a lever arranged to have one end part thereof rotatably supported by one of said chassis and said cassette holder and to have the other end part thereof provided with a gear part;

d) an urging member arranged to urge said cassette holder to move from the first position to the second position;

e) a damper having a gear part arranged to engage the gear part of said lever;

f) a lock lever rotatably mounted at one end thereof on said cassette holder and arranged to be locked to said chassis when said cassette holder is in the first position; and g) a restricting part provided on said lock lever at an other end thereof and arranged to restrict a free movement of said lock lever in the direction of said lock lever's own thickness and hold said lock lever when said cassette holder is in the second position.

12. A cassette loading device, comprising:

a) a chassis;

b) a cassette holder for holding a cassette;

c) a link mechanism arranged to support said cassette holder in such a way as to move said cassette holder between a first position and a second position relative to said chassis, said first position being a descended position of said cassette and said second position being an ascended position of said cassette, said link mechanism including a lever arranged to have one end part thereof rotatably supported by one of said chassis and said cassette holder and to have the other end part thereof provided with a gear part and slidably engaging the other of said chassis and said cassette holder, said gear part being composed of at least first and second gears having different pitch circles and being continuously formed;

d) an urging member arranged to urge said cassette holder to move from the first position to the second position;

e) a damper having a gear part arranged to engage the gear part of said lever; and wherein the pitch circle diameter of said first gear that engages said damper when said cassette holder is in the first position is D1 and the pitch circle diameter of said second gear that engages said damper when said cassette holder is in the second position is D2, said first and second gears are arranged to be in a relation of D1<D2.

13. A device according to claim 11, further comprising a sliding mechanism provided with a cam slot and a shaft for allowing said lever to slide.

14. A device according to claim 13, wherein said cam slot includes a wide part in addition to a narrow part, and said wide part is formed partly on the same plane as said narrow part and partly on a different plane.

15. A device according to claim 14, wherein said cam slot is formed in said lever, and a part of said wide part formed on the different plane is formed in an end part of said lever as a bent part of said lever.

16. A device according to claim 13, wherein said cam slot is formed in said lever and said shaft is disposed on said chassis.

17. A device according to claim 13, wherein said cam slot is formed in said chassis, and said shaft is disposed on said lever.

18. A device according to claim 11, wherein said cassette holder includes a lock lever arranged to be locked to said chassis when said cassette holder is in the first position.

19. A device according to claim 18, further comprising a restricting part arranged to restrict a free movement of said lock lever when said cassette holder is in the second position.

20. A device according to claim 19, wherein said restricting part is disposed on said lock lever and is arranged to engage said lever of said link mechanism.

21. A cassette loading device comprising:
 a) a chassis;
 b) a cassette holder for holding a cassette;
 c) a link mechanism arranged to support said cassette holder in such a way as to move said cassette holder between a first position and a second position relative to said chassis, said link mechanism including a lever arranged to have one end part thereof rotatably supported by one of said chassis and said cassette holder and to have the other end part thereof provided with a gear part and slidably engaging the other of said chassis and said cassette holder;
 d) an urging member arranged to urge sad cassette holder to move from the first position to the second position;
 e) a damper having a gear part arranged to engage the gear part of said lever; and
 f) a sliding mechanism comprising a cam slot formed on said lever and a shaft for allowing said lever to slide, said lever being formed with a bent part at an end part thereof, said bent part extending in a direction away from a plane of a remaining part of said lever, said cam slot including a narrow part and a wide part continuously formed in addition to said narrow part and partly extended up to said bent part of said lever, said narrow part enabling guiding of the sliding operation of said lever and said wide part enabling engagement or disengagement between said cam slot and said shaft.

22. A device according to claim 21, wherein said cassette holder includes a lock lever arranged to be locked to said chassis when said cassette holder is in the first position.

23. A device according to claim 22, further comprising a restricting part arranged to restrict a free movement of said lock lever when said cassette holder is in the second position.

24. A device according to claim 23, wherein said restricting part is disposed on said lock lever and is arranged to engage said lever of said link mechanism.

* * * * *

UNITED STATES PATENT AND TRADEMARK OFFICE
CERTIFICATE OF CORRECTION

PATENT NO. : 6,038,100 Page 1 of 1
APPLICATION NO. : 08/508355
DATED : March 14, 2000
INVENTOR(S) : Osamu Nagatsuka It is certified that error appears in the above-identified patent and that said Letters Patent is hereby corrected as shown below:

Col. 5, line 9, delete "11'aof" and insert -- 11a of --.
Col. 11, line 1, delete "claim 11" and insert -- claim 12 --.
Col. 11, line 18, delete "claim 11" and insert -- claim 12 --.
Col. 12, line 7, delete "sad" and insert -- said --.

Signed and Sealed this

Thirty-first Day of July, 2007

JON W. DUDAS
*Director of the United States Patent and Trademark Office*